United States Patent Office 3,096,352
Patented July 2, 1963

3,096,352
ANDROSTANE COMPOUNDS CONTAINING TRIFLUORO ALIPHATIC SUBSTITUENTS IN THE 2-POSITION
Marcel Harnik, Morristown, Tenn., assignor to Chemetron Corporation, Chicago, Ill., a corporation of Delaware
No Drawing. Filed July 13, 1961, Ser. No. 123,630
8 Claims. (Cl. 260—397.4)

This invention relates to androstane compounds of the following general formula and to the production thereof:

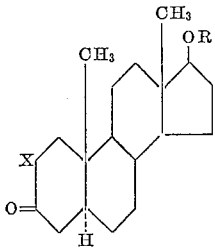

wherein R is a member of the group consisting of hydrogen and lower alkanoyl radicals such as formyl, acetyl, propionyl and butyryl radicals and X is a member of the group consisting of trifluoroacetyl, 2,2,2-trifluoro-1-acetoxyethylidene, 2,2,2-trifluoro-1-hydroxyethyl, 2,2,2-trifluoro - 1 - acetoxyethyl, 2,2,2-trifluoroethylidene, and 2,2,2-trifluoroethyl radicals.

The compounds of this invention have adrenocortical activity and are useful in the relief of inflammation of rheumatoid arthritis and similar collagen and allergic conditions. They have particular utility in inducing thymolytic corticoid activity in mammals and can be applied parenterally in aqueous suspensions or in innocuous organic solvents. They are thus useful in supplementing the cortical hormone production of mammals without the side effects of the progestational hormones. These compounds are also useful as intermediates in the synthesis of adrenocorticoid compounds.

It is an object of this invention to provide new androstane compounds which have useful physiological activity. It is a further object to provide efficient methods for producing such compounds from available steroids. Another object is to provide androstane compounds having fluorinated aliphatic radicals in the 2-position which are useful as adrenocorticoids. These and other objects are apparent from and are achieved in accordance with the following disclosure.

The compounds of this invention are produced from androstane-17-ol-3-one. The first step is the condensation of androstane-17-ol-3-one with an alkyl ester of trifluoroacetic acid, of difluoroacetic acid or of monofluoroacetic acid, in the presence of an alkaline condensing agent such as an alkali metal hydride or an alkali metal alkoxide in an inert solvent. The condensation is preferably conducted in a nonoxidizing atmosphere at a temperature in the range of 50–150° C. By this procedure a trifluoroacetyl, difluoroacetyl or monofluoroacetyl radical is introduced at the 2-position of androstane-17-ol-3-one. The tri-, di- or monofluoroacetylandrostanolone can then be reacted with an alkanoic acid anhydride, preferably in the presence of a basic solvent such as pyridine, quinoline or dimethylaniline, to form an enol alkanoate from the β-diketone which is formed by the introduction of the substituted acetyl radical at the 2-position of the androstanolone. The trifluoroacetyl radical in the 2-position can be hydrogenated, for example, with a noble metal catalyst, to form a 2,2,2-trifluoro-1-hydroxyethyl radical, which can be acylated, for example, with acetic anhydride or chloride, to form a 2,2,2-trifluoro-1-acyloxyethyl radical. The 2,2,2-trifluoro-1-hydroxyethyl radical in the 2-position of androstane-17-ol-3-one can be dehydrated, for example, with boiling concentrated formic acid or alkaline earth silicates, to the corresponding 2,2,2-trifluoroethylidene radical and the latter can be hydrogenated to a trifluoroethyl radical.

The invention is disclosed in further detail by means of the following examples which are provided to illustrate the invention without limiting it thereto. It will be apparent to those skilled in the art that various modifications in reaction conditions, reagents and equivalent materials can be made without departing from the invention herein disclosed.

EXAMPLE 1

2-Trifluoroacetylandrostane-17β-Ol-3-One

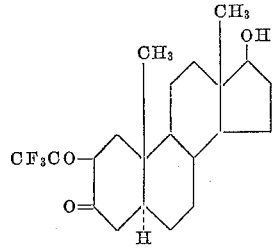

A mixture of 1.257 g. of androstane-17β-ol-3-one, 30 ml. of dry benzene, 0.6 g. of sodium methoxide and 2 ml. of ethyl trifluoroacetate was refluxed slowly under nitrogen with stirring. The mixture was cooled, treated with cold 5% hydrochloric acid and stirred until all the solid dissolved. The benzene layer was separated, washed with water and with saturated NaCl solution, dried and evaporated. The residue of 2-trifluoroacetylandrostane-17β-ol-3-one was dissolved in ether and agitated with 10% KOH solution. The white precipitate of the potassium salt of 2-trifluoroacetylandrostane-17β-ol-3-one was separated, washed with water and with ether, suspended in fresh ether and agitated with cold 5% hydrochloric acid until the solid dissolved. The ether layer was separated, washed with water and with saturated NaCl solution, dried and evaporated. The residue of crystalline 2-trifluoroacetylandrostane-17β-ol-3-one amounted to 0.947 g., M.P. 123.5–127° C. Its I.R. absorption spectrum had peaks at 6.13 and 6.33 microns.

EXAMPLE 2

2-(2,2,2-Trifluoro-1-Hydroxyethylidene)Androstane-17β-Ol-3-One Diacetate

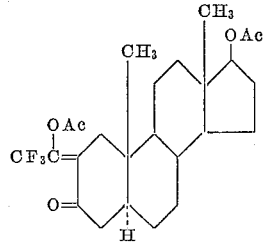

650 mg. of 2-trifluoroacetylandrostane-17β-ol-3-one was dissolved in 3 ml. of pyridine and 2 ml. of acetic anhydride and left at room temperature for 16 hours. The solution was evaporated in vacuo on a steam bath and the solid residue was triturated with cold methanol and filtered. There was obtained 0.35 g. of 2-(2,2,2-trifluoro-1-hydroxyethylidene)androstane - 17β - ol-3-one diacetate, M.P. 157.5–158.5° C. Its I.R. absorption spectrum (KBr) had peaks at 5.55, 5.61, 5.72, 5.88 and 6.03 microns. Its U.V. absorption spectrum had a maximum at 263 millimicrons (E=6,880). Its optical rotation was $[\alpha]_D^{25}$ +30°.

On standing 2-(2,2,2-trifluoro-1-hydroxyethylidene)-androstane-17β-ol-3-one diacetate hydrolyzed to 2-trifluoroacetylandrostane-17β-ol-3-one acetate, M.P. 100–105° C.

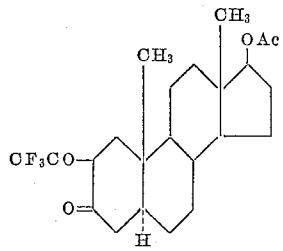

Its I.R. absorption spectrum had peaks at 5.80, 6.22 and 6.40 microns.

EXAMPLE 3

*2-(2,2,2-Trifluoro-1-Hydroxyethyl)Androstane-17β-Ol-3-One*

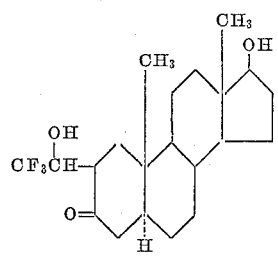

The 2-trifluoroacetylandrostane-17β-ol-3-one prepared from 24 g. of androstane-17β-ol-3-one by the method of Example 1 was dissolved in 200 ml. of methanol and was hydrogenated at room temperature and 40–50 p.s.i.g. for 18 hours in the presence of 10 g. of 5% palladium-charcoal catalyst. The mixture was filtered and the filtrate evaporated. The residue of 2-(2,2,2-trifluoro-1-hydroxyethyl)androstane-17β-ol-3-one was crystallized from aqueous methanol; yield 2.59 g., M.P. 98° C. On dilution with water and refrigeration, the mother liquor gave 6 g. of crystalline product of M.P. 95° C. The combined crops on recrystallization from 60% aqueous methanol gave 7.73 g. of solvated prisms. On further recrystallization from 80% methanol and drying in vacuo at 120° C. for several hours, the pure 2-(2,2,2-trifluoro-1-hydroxyethyl)androstane-17β-ol-3-one in non-solvated form was obtained, M.P. 149–151° C. Its I.R. absorption spectrum had peaks at 2.88 and 5.91 microns.

EXAMPLE 4

*2-(2,2,2-Trifluoro-1-Hydroxyethyl)Androstane-17β-Ol-3-One Diacetate*

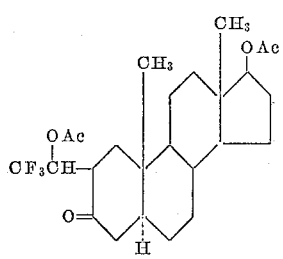

200 mg. of 2-(2,2,2-trifluoro-1-hydroxyethyl)androstane-17β-ol-3-one dissolved in 2 ml. of pyridine and 2 ml. of acetic anhydride was kept at room temperature for 15 hours. The solution was diluted with ice and water and the precipitate of the diacetate was recrystallized from pentane. 2-(2,2,2-trifluoro-1-hydroxyethyl)androstane-17β-ol-3-one diacetate melted at 124–125° C. and its I.R. absorption spectrum (KBr) had peaks at 5.64 and 5.70 microns.

EXAMPLE 5

*2-(2,2,2-Trifluoroethylidenyl)Androstane-17β-Ol-3-One Formate*

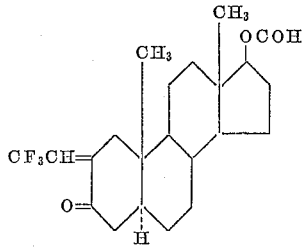

5.70 grams of 2-(2,2,2-trifluoro-1-hydroxyethyl)-androstane-17β-ol-3-one was dissolved in 100 ml. of 98% formic acid and refluxed for 15 minutes. Ice and water were added and a crystalline precipitate of 2-(2,2,2-trifluoroethylidenyl)androstane-17β-ol-3-one formate formed on standing; yield 5.03 g. On recrystallization from aqueous methanol the product melted at 123–125° C.

EXAMPLE 6

*2α-(2,2,2-Trifluoroethyl)Androstane-17β-Ol-3-One Acetate*

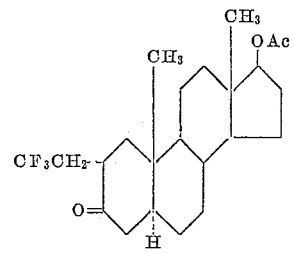

1.96 grams of 2-(2,2,2-trifluoroethylidenyl)androstane-17β-ol-3-one formate was hydrogenated in 100 ml. of methanol with 1.0 g. of 5% palladium-charcoal catalyst. The mixture was filtered and the filtrate evaporated. The residue of 2-(2,2,2-trifluoroethyl)androstane-17β-ol-3-one formate was hydrolyzed to the 17β-ol compound by solution in 5% methanolic KOH solution. The solution was diluted with water and acidified with dilute hydrochloric acid, precipitating 2-(2,2,2-trifluoroethyl)androstane-17β-ol-3-one of M.P. 98–120° C. This product was dissolved in 10 ml. of pyridine and 10 ml. of acetic anhydride, and refluxed for 5 minutes. The solution was evaporated to dryness in vacuo and the crystalline 2α-(2,2,2-trifluoroethyl)androstane-17β-ol-3-one acetate was separated and recrystallized from methanol; M.P. 112.5–114.5° C.

What is claimed as new and desired to be secured by Letters Patent of the United States is:

1. An androstane compound of the formula

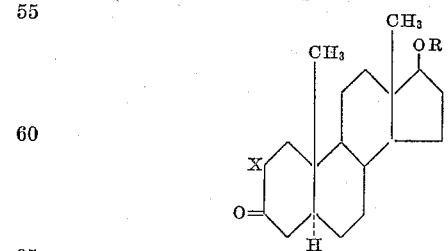

wherein R is a member of the group consisting of hydrogen and lower alkanoyl radicals and X is a member of the group consisting of trifluoroacetyl, 2,2,2-trifluoro-1-acetoxy-ethylidene, 2,2,2-trifluoro-1-hydroxyethyl, 2,2,2-trifluoro-1-acetoxyethyl, 2,2,2-trifluoroethylidene, and 2,2,2-trifluoroethyl radicals.

2. A compound as defined by claim 1 wherein R is hydrogen and X is trifluoroacetyl.

3. A compound as defined by claim 1 wherein R is acetyl and X is 2,2,2-trifluoro-1-acetoxyethylidene.

4. A compound as defined by claim 1 wherein R is acetyl and X is trifluoroacetyl.

5. A compound as defined by claim 1 wherein R is hydrogen and X is 2,2,2-trifluoro-1-hydroxyethyl.

6. A compound as defined by claim 1 wherein R is acetyl and X is 2,2,2-trifluoro-1-acetoxyethyl.

7. A compound as defined by claim 1 wherein R is formyl and X is 2,2,2-trifluoroethylidene.

8. A compound as defined by claim 1 wherein R is acetyl and X is 2,2,2-trifluoroethyl with the α-configuration.

References Cited in the file of this patent
UNITED STATES PATENTS 3,013,032   Nathan _____ Dec. 12, 1961